United States Patent
Davis et al.

(10) Patent No.: US 11,545,126 B2
(45) Date of Patent: Jan. 3, 2023

(54) ARRANGEMENTS AND METHODS FOR ENHANCED COMMUNICATION ON AIRCRAFT

(71) Applicant: Gulfstream Aerospace Corporation, Savannah, GA (US)

(72) Inventors: Bethany Davis, Savannah, GA (US); Amy Mayo, Savannah, GA (US); Scott Bohanan, Savannah, GA (US); Jim Jordan, Savannah, GA (US); John Maxon, Savannah, GA (US); Paul Conti, Savannah, GA (US); Tongan Wang, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/355,390

(22) Filed: Mar. 15, 2019

(65) Prior Publication Data
US 2020/0234688 A1    Jul. 23, 2020

Related U.S. Application Data

(60) Provisional application No. 62/793,530, filed on Jan. 17, 2019.

(51) Int. Cl.
*G10K 11/178* (2006.01)
*B64D 47/00* (2006.01)

(52) U.S. Cl.
CPC ........ *G10K 11/17857* (2018.01); *B64D 47/00* (2013.01); *G10K 2210/1281* (2013.01); *G10K 2210/3012* (2013.01)

(58) Field of Classification Search
CPC .......... G10K 11/17857; G10K 11/178; G10K 2210/1281; G10K 2210/3012;
(Continued)

(56) References Cited

U.S. PATENT DOCUMENTS 2,182,632 A * 12/1939 Kiernan ............... G11B 27/034
369/7
3,079,112 A * 2/1963 Campbell ............. B64C 1/1476
244/122 R
(Continued)

FOREIGN PATENT DOCUMENTS

JP        H06161468 A      6/1994

OTHER PUBLICATIONS

Kara Godfrey, Flight Secrets: Pilot reveals secret behind turning mobile phones off onboard, Travel News, Travel Express.co.uk, Jan. 10, 2019.
(Continued)

*Primary Examiner* — Xu Mei
(74) *Attorney, Agent, or Firm* — LKGlobal | Lorenz & Kopf, LLP

(57) ABSTRACT

Arrangements for communication and/or noise attenuation within an aircraft, and aircraft and methods for making aircraft including such arrangements are provided. In one example, an arrangement includes an array of first microphones cooperatively configured to be directed towards a first aircraft operator when disposed in a first cockpit seat to receive a first communication input from the first aircraft operator. An array of first speakers is cooperatively configured to be directed towards the first aircraft operator when disposed in the first cockpit seat to provide a first communication output to the first aircraft operator.

17 Claims, 3 Drawing Sheets

(58) Field of Classification Search
CPC ............... B64D 47/00; B64D 11/0624; B64D 11/0689; B64D 11/0691
USPC ............... 381/71.4, 71.6, 86, 77, 79, 91, 92
See application file for complete search history.

(56) References Cited

U.S. PATENT DOCUMENTS

| | | | | |
|---|---|---|---|---|
| 5,133,017 | A * | 7/1992 | Cain | G01R 33/3854 |
| | | | | 381/71.6 |
| 5,568,557 | A * | 10/1996 | Ross | G10K 11/1788 |
| | | | | 381/71.11 |
| 6,343,127 | B1 * | 1/2002 | Billoud | G10K 11/178 |
| | | | | 381/71.4 |
| 7,383,106 | B1 * | 6/2008 | Coonse, Jr. | G10K 11/178 |
| | | | | 701/10 |
| 9,247,346 | B2 * | 1/2016 | Kuo | H04R 3/002 |
| 9,950,793 | B2 * | 4/2018 | Tracy | B64D 11/00154 |
| 2002/0076059 | A1 * | 6/2002 | Joynes | H04R 5/023 |
| | | | | 381/71.6 |
| 2008/0273713 | A1 | 11/2008 | Hartung et al. | |
| 2010/0104110 | A1 * | 4/2010 | Asao | G10K 11/17861 |
| | | | | 381/71.3 |
| 2014/0112496 | A1 * | 4/2014 | Murgia | G10L 21/06 |
| | | | | 381/92 |
| 2018/0277089 | A1 * | 9/2018 | Tonon | G10K 11/17815 |

OTHER PUBLICATIONS

Steven Musil, FAA bans pilots' personal use of electronic devices in cockpit, CNET, Feb. 11, 2014.

\* cited by examiner

ARRANGEMENTS AND METHODS FOR ENHANCED COMMUNICATION ON AIRCRAFT

CROSS-REFERENCE TO RELATED APPLICATIONS

This application is related to and claims all available benefit of U.S. Provisional Patent Application 62/793,530 filed Jan. 17, 2019, the entire contents of which are herein incorporated by reference.

TECHNICAL FIELD

The technical field relates generally to communication and/or noise reduction for an aircraft, and more particularly, relates to an arrangement that enhances communication in the aircraft cockpit, for example, while reducing noise in the cockpit and/or the aircraft cabin, and an aircraft and a method for making an aircraft including such an arrangement.

BACKGROUND

Aircraft cockpit areas in general can be relatively noisy during flight and aircraft operators, e.g., pilots, copilots, and the like, typically wear headsets for communicating in such an environment, for example, with air traffic control, receiving alert messages, or the like. Further, wearing headsets allows the aircraft operators to communicate at normal speaking volume levels that are less likely to be transmitted into the cabin area to help maintain a quiet or un-disturbing environment for the passengers.

However, aircraft operators are flying aircrafts for relatively long periods of time and wearing headsets can become cumbersome and/or uncomfortable over extended periods of time. Further, wearing headsets can make communicating between the pilot and the copilot and/or other aircraft operators somewhat awkward or uncomfortable.

Accordingly, it is desirable to provide a headset-less arrangement for aircraft operators that facilitates communication at normal or reduced volume levels, and an aircraft and a method for making an aircraft including such an arrangement. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an arrangement for communication and/or noise attenuation within an aircraft, an aircraft and a method for making an aircraft including such an arrangement, are provided herein.

In a first non-limiting embodiment, the arrangement includes, but is not limited to, an array of first microphones that is cooperatively configured to be directed towards a first aircraft operator when disposed in a first cockpit seat to receive a first communication input from the first aircraft operator. The arrangement further includes, but is not limited to, an array of first speakers cooperatively configured to be directed towards the first aircraft operator when disposed in the first cockpit seat to provide a first communication output to the first aircraft operator.

In another non-limiting embodiment, the aircraft includes, but is not limited to, a fuselage that has an interior. The fuselage includes a cockpit and a cabin area that are disposed in the interior separated by one or more barriers including at least one of a cabin bulkhead or curtain. The aircraft further includes, but is not limited to, a first cockpit seat that is disposed in the cockpit and that is configured for supporting a first aircraft operator. The aircraft further includes, but is not limited to, an arrangement for at least one of communication and noise attenuation within the aircraft. The arrangement includes, but is not limited to, an array of first microphones that is disposed in the cockpit. The array of first microphones is cooperatively directed towards the first cockpit seat to receive a first communication input from the first aircraft operator. The arrangement includes, but is not limited to, an array of first speakers that is disposed in the cockpit. The array of first speakers is cooperatively directed towards the first cockpit seat to provide a first communication output to the first aircraft operator.

In another non-limiting embodiment, the method includes, but is not limited to, introducing an arrangement to a fuselage of the aircraft. The fuselage has an interior and includes a cockpit and a cabin area that are disposed in the interior separated by one or more barriers including at least one of a cabin bulkhead or curtain. The method further includes, but is not limited to, installing the arrangement into the fuselage for at least one of communication and noise attenuation within the aircraft. Installing the arrangement includes, but is not limited to, disposing an array of first microphones in the cockpit of the aircraft. The array of first microphones is cooperatively configured to be directed towards a first aircraft operator when disposed in a first cockpit seat to receive a first communication input from the first aircraft operator. Installing the arrangement further includes, but is not limited to, disposing an array of first speakers in the cockpit of the aircraft. The array of first speakers is cooperatively configured to be directed towards the first aircraft operator when disposed in the first cockpit seat to provide a first communication output to the first aircraft operator.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
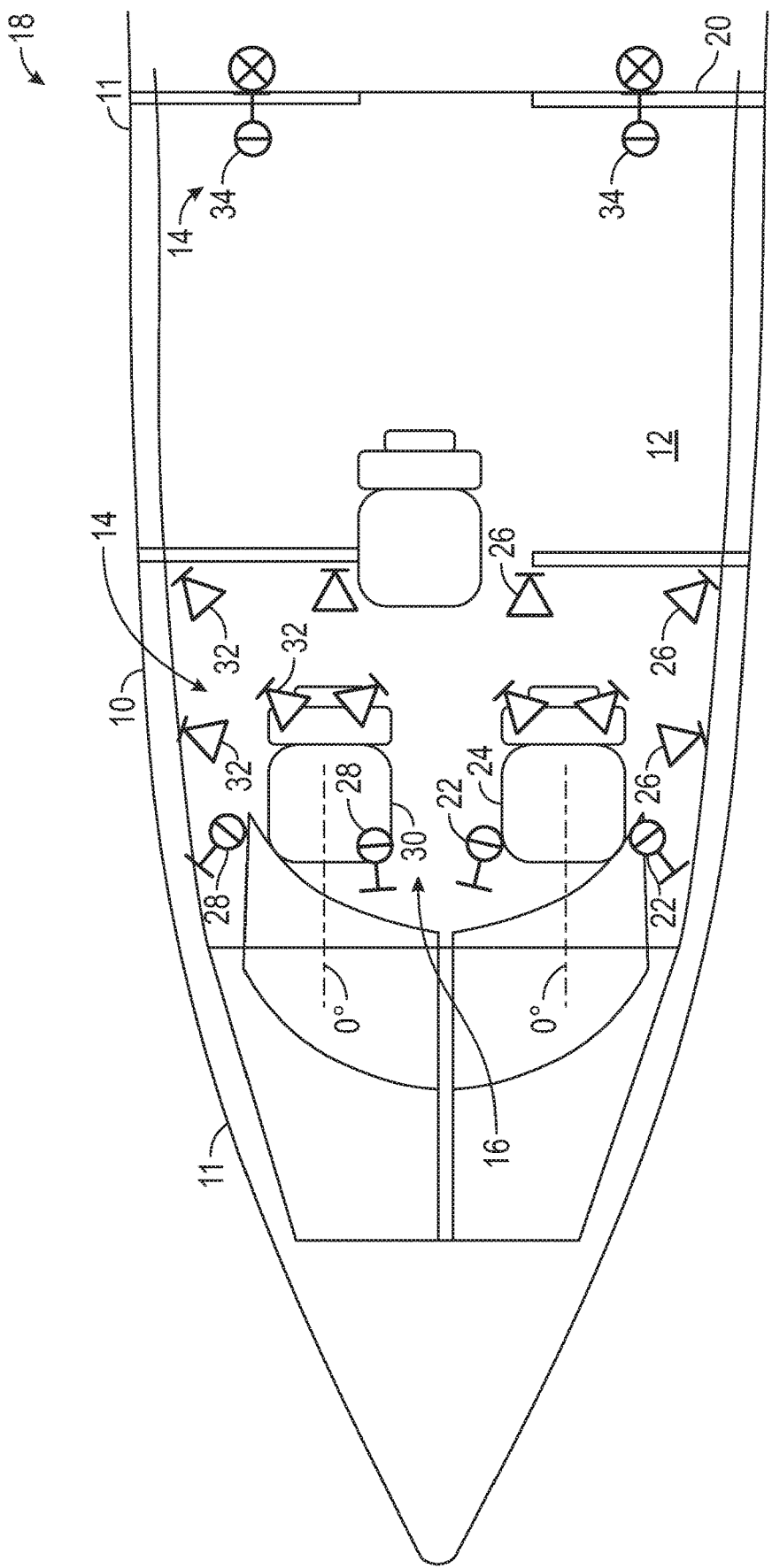
FIG. 1 illustrates a top view of schematic representation of a portion of an aircraft including the aircraft interior and an arrangement for communication and/or noise attenuation in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to an arrangement for communication and/or noise attenuation within an aircraft, and an aircraft and a method for making an aircraft including such an arrangement. The arrangement includes an array of first microphones that is disposed in the cockpit of the aircraft directed towards a first aircraft operator, e.g., pilot or copilot, when seated or otherwise positioned in a first cockpit seat. The array of first microphones is cooperatively configured to receive a first communication input from the first aircraft operator. An array of first speakers is disposed in the cockpit of the aircraft directed towards the first aircraft operator when seated or otherwise positioned in the first cockpit seat. The array of first speakers is cooperatively configured to provide a first communication output to the first aircraft operator.

In an exemplary embodiment, the arrangement further includes an array of second microphones that is disposed in the cockpit of the aircraft directed towards a second aircraft operator, e.g., copilot or pilot, when seated or otherwise positioned in a second cockpit seat. The array of second microphones is cooperatively configured to receive a second communication input from the second aircraft operator. An array of second speakers is disposed in the cockpit of the aircraft directed towards the second aircraft operator when seated or otherwise positioned in the second cockpit seat. The array of second speakers is cooperatively configured to provide a second communication output to the second aircraft operator.

In an exemplary embodiment, it has been found that by directing the array of first microphones and the array of first speakers towards the first aircraft operator, the first aircraft operator is able to communicate effectively at normal or reduced volume levels without the use of a headset and without cross communication from the second aircraft operator. Further, in an exemplary embodiment, it has been found that by directing the array of second microphones and the array of second speakers towards the second aircraft operator, the second aircraft operator is able to communicate effectively at normal or reduce volume levels without the use of a headset and without cross communication from the first aircraft operator. By directing the speaker outputs to the first aircraft operator and the second aircraft operator, the output signals transmitted to other areas of the cockpit and the aircraft interior can be minimized. Further, in an exemplary embodiment, the first and second aircraft operators, who are seated adjacent to each other and not wearing headsets, are able to easily and comfortably directly communicate with each other at a normal or reduced volume of speech.

In an exemplary embodiment and as will be discussed in further detail below, the arrangement further includes active and/or passive noise cancellation and/or monitoring devices in the cockpit area, cabin bulkhead, and/or cabin area. Further, in an exemplary embodiment, the arrangement further includes a controller(s) (e.g., one or more controllers or systems, for example that are in communication with each other) that is in communication with the arrays of first microphones, second microphones, first speakers, second speakers, and active and/or passive noise cancellation and/or monitoring devices and that is operative to use an algorithm for controlling communication and/or noise attenuation.

FIG. 1 illustrates a top view of a portion of an aircraft 10 including a fuselage 11 with an aircraft interior 12 and an arrangement 14 disposed therein for communication and/or noise attenuation in accordance with an exemplary embodiment. The aircraft interior 12 includes a cockpit 16 and a cabin area 18 that are separated by barriers such as a cabin bulkhead or curtain 20.

In an exemplary embodiment, the arrangement 14 includes an array of microphones 22 (e.g., directional microphone array) that are disposed in the cockpit 16 of the aircraft 10 directed towards a first aircraft operator, e.g., pilot, when seated or otherwise positioned in a cockpit seat 24. The array of microphones 22 is cooperatively configured to receive communication inputs from the first aircraft operator. As illustrated, the array of microphones 22 may be positioned proximate to and generally in front of, at various angles (e.g., from about −45° to about 45°), the first aircraft operator when seated in the cockpit seat 24. In an exemplary embodiment, the array of microphones 22 includes at least 2 microphones, such as from 2 to 6 microphones, for example 2 to 4 microphones.

An array of speakers 26 (e.g., directional speaker array) is disposed in the cockpit 16 of the aircraft 10 directed towards the first aircraft operator when seated or otherwise positioned in the cockpit seat 24. The array of speakers 26 is cooperatively configured to provide communication outputs to the first aircraft operator. As illustrated, the array of speakers 26 may be positioned proximate to and generally behind, at various angles (e.g., from about 135° to about 225°), the first aircraft operator when seated in the cockpit seat 24. In an exemplary embodiment, the array of speakers 26 includes at least 2 speakers, such as from 2 to 6 speakers, for example 2 to 4 speakers.

In an exemplary embodiment, the arrangement 14 further includes an array of microphones 28 (e.g., directional microphone array) that are disposed in the cockpit 16 of the aircraft 10 directed towards a second aircraft operator, e.g., copilot, when seated or otherwise positioned in a cockpit seat 30. The array of microphones 28 is cooperatively configured to receive communication inputs from the second aircraft operator. As illustrated, the array of microphones 28 may be positioned proximate to and generally in front of, at various angles (e.g., from about −45° to about 45°), the second aircraft operator when seated in the cockpit seat 30. In an exemplary embodiment, the array of microphones 28 includes at least 2 microphones, such as from 2 to 6 microphones, for example 2 to 4 microphones.

An array of speakers 32 (e.g., directional speaker array) is disposed in the cockpit 16 of the aircraft 10 directed towards the second aircraft operator when seated or otherwise positioned in the cockpit seat 30. The array of speakers 32 is cooperatively configured to provide communication outputs to the second aircraft operator. As illustrated, the array of speakers 32 may be positioned proximate to and generally behind, at various angles (e.g., from about −135° to about 45°), the second aircraft operator when seated in the cockpit seat 30. In an exemplary embodiment, the array of speakers 32 includes at least 2 speakers, such as from 2 to 6 speakers, for example 2 to 4 speakers.

Figure 3:
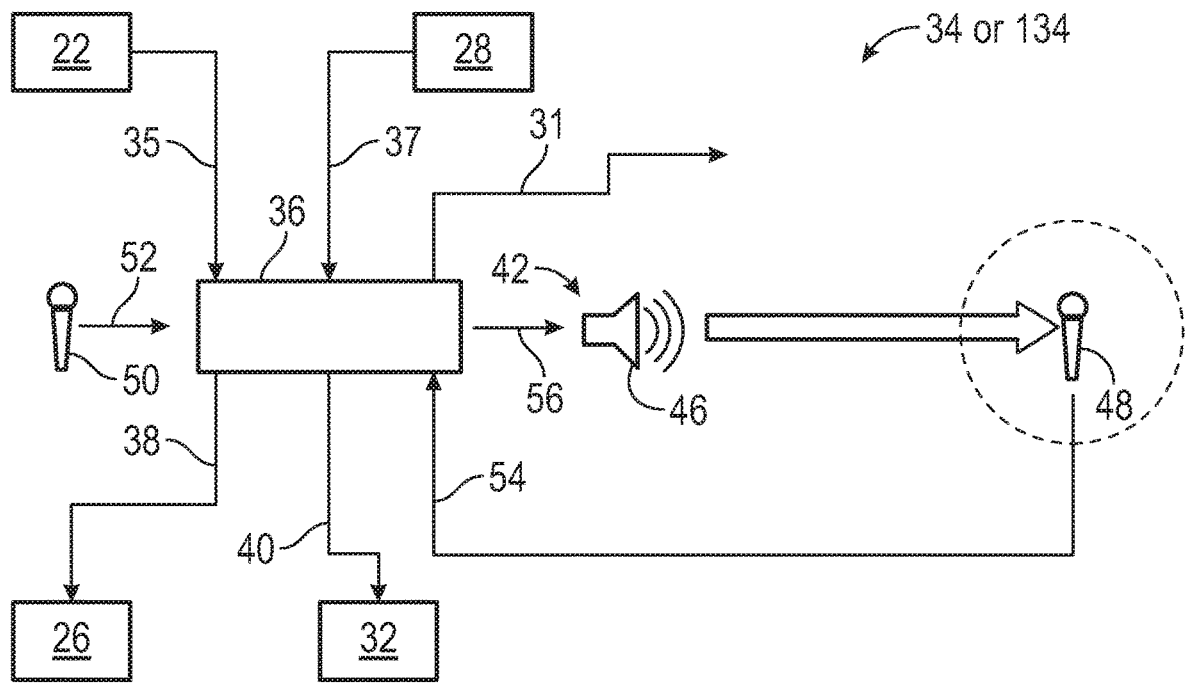
FIG. 3 illustrates a schematic representation of an arrangement for communication and/or noise attenuation in accordance with an exemplary embodiment.

Referring also to FIG. 3, in an exemplary embodiment, it has been found that by using the directional arrays of microphones 22 and 28 in which one array of microphones 22 is directed and focused towards the first aircraft operator and the other array of microphones 28 is directed and focused towards the second aircraft operator, each of the microphones for the corresponding array 22 or 28 can pick up a relatively low noise signal of the communication inputs such that collectively the microphones of the corresponding array 22 or 28 can provide an enhanced input signal 35 or 37 to a controller(s) 36. In particular, the enhanced input signal 35 or 37 is calculated from each of the microphones of the corresponding array 22 or 28. The noise inputs from other cockpit areas or other aircraft operators will be minimized because the microphone array is most sensitive toward the first and the second operators. In an exemplary embodiment, the controller(s) 36, using an algorithm, is configured to directly or indirectly transmit and/or communicate the communication inputs from the first and/or second aircraft operators, for example to the air traffic control tower, the onboard aircraft speaker system, or the like (via line 31), in response to the enhanced input signal. As such, the first aircraft operator, and independently, the second aircraft operator can communicate at a normal or reduced voice volume level yet still communicate safely and comfortably without the use of headsets.

Likewise, in an exemplary embodiment, it has been found that by using the directional arrays of speakers 26 and 32 in which one array of the speakers 26 is directed and focused towards the first aircraft operator and the other array of speakers 32 is directed and focused towards the second aircraft operator, each of the speakers for the corresponding array 26 or 32 can produce a relatively low noise signal of the communication outputs such that collectively the speakers of the corresponding array 26 or 32 can provide a clear audible, enhanced communication output signal with minimum noise correspondingly to the first aircraft operator, and independently, to the second aircraft operator. In particular, the clear audible, the enhanced communication output signal is the optimal combination of all signals from each of the speakers of the corresponding array 26 or 32. In an exemplary embodiment, the controller(s) 36, using the algorithm, is configured to communicate via lines 38 and 40 with the speakers of the arrays 26 and 32, respectively, in response to communications received, for example from the air traffic control tower, or the like, to produce the relatively low noise signals. As such, the first aircraft operator, and independently, the second aircraft operator can receive communication at a normal volume level without the use of headsets. Furthermore, the speaker outputs to other cockpit areas, cabin areas, or other aircraft operators will be minimized because most of the output energy is focused toward the first and the second operators.

Further, in an exemplary embodiment, the first aircraft operator and the second aircraft operator may have independent control of their respective arrays of microphones 22 and 28 and arrays of speakers 26 and 32, via the controller(s) 36 using the algorithm, to control the sound around them. That is, the controller(s) 36 is configured to provide adaptive control to create customized acoustic environment, independently for each of the first aircraft operator and the second aircraft operator. For example, the first aircraft operator and the second aircraft operator could each turn off their respective arrays of microphones 22 and 28 and optionally the arrays of speakers 26 and 32 so that they could directly communicate with each other in a relatively quiet environment. In another example, only one of the first aircraft operator or the second aircraft operator would have their array of microphones 22 or 28 turned on while the other array of microphones 22 or 28 is turned off to facilitate clear, audible communication with the air traffic control tower by one of the first aircraft operator or the second aircraft operator.

As illustrated, in an exemplary embodiment, the arrangement 14 further includes, optionally includes, or alternatively includes (e.g., instead of the arrays of microphones 22 and 28 and the arrays of speakers 26 and 32) active and/or passive noise cancellation 34 in the cockpit 16 and/or the cabin bulkhead 20. In one example, the active and/or passive noise cancellation 34 includes one or more passive noise cancellation devices that are disposed in the cabin bulkhead 20 and that are configured for attenuating noise within the aircraft. Examples of passive noise cancellation devices include insulation, sound absorption structures, or the like In another example and as discussed further below, the active and/or passive noise cancellation 34 includes one or more active noise cancellation devices 42 that are in communication with the controller(s) 36, which uses the algorithm, for controlling the noise attenuation within the cockpit 16 and/or cabin area 18. Examples of active noise cancellation devices 42 include devices such as microphones, speakers, amplifiers and/or the like that cooperative to generate, for example, out of phase signals for cancellation and/or attenuation of undesirable noise(s). In an exemplary embodiment, the active and/or passive noise cancellation 34 ensures that noise in the cockpit 16 is not being transferred into the cabin area 18, except for the alert messages and other desired communications that may be routed over the cabin speaker system.

Figure 2:
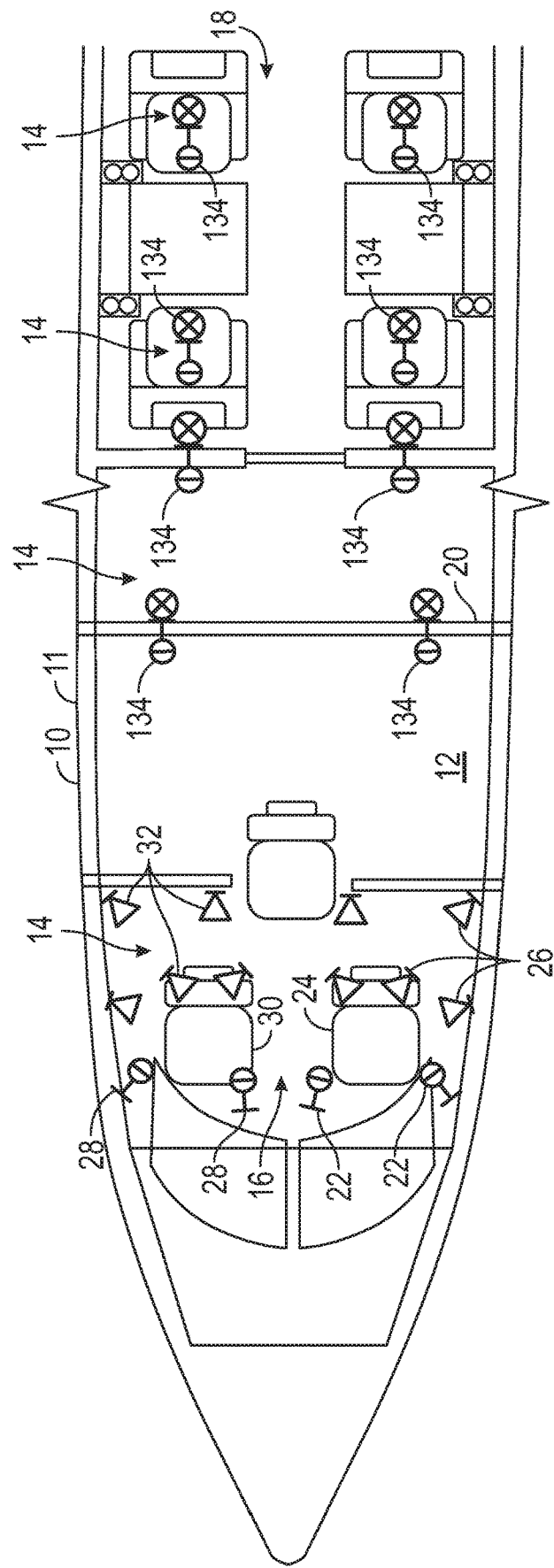
FIG. 2 illustrates a top view of schematic representation of a portion of an aircraft including the aircraft interior and an arrangement for communication and/or noise attenuation in accordance with another exemplary embodiment.

FIG. 2 illustrates a top view of the portion of the aircraft 10 including the aircraft interior 12 and the arrangement 14 as shown in FIG. 1 and discussed above including the cockpit 16, the cabin area 18, the cabin bulkhead 20, the array of microphones 22, the cockpit seat 24, the array of speakers 26, the array of microphones 28, the cockpit seat 30, and the array of speakers 32, but with the exception that the active and/or passive noise cancellation 134, which may be included, optionally included, or alternatively included, replaces the active and/or passive noise cancellation 34 of FIG. 1. In particular, the active and/or passive noise cancellation 134 is similar to the active and/or passive noise cancellation 34 but may be in the cockpit 16, the cabin bulkhead 20, the cabin area 18, and/or anyplace between the cockpit 16 and the cabin area 18.

In an exemplary embodiment and as illustrated in FIGS. 2-3, the active noise cancellation device(s) 42 includes one or more noise cancellation speakers 46, one or more cabin microphones 48 (e.g., microphone(s) located in the cabin area 18), and one or more cockpit microphones 50 (e.g., microphone(s) located in the cockpit 16) that are in communication with the controller(s) 36. The controller(s) 36 is configured to receive a microphone signal(s) 52 (from the cockpit microphone(s) 50) and/or to receive a microphone signal(s) 54 (from the cabin microphone(s) 48) that are indicative of the noise level in the cockpit 16 and the cabin area 18, respectively. Using the algorithm, the controller(s) 16 generates a control signal(s) 56 for controlling the noise cancellation speaker(s) 46 to cancel and/or attenuate the undesirable noise. In one example, one or more of the noise cancellation speakers 56 are disposed in the cockpit 16 to cancel and/or attenuate undesirable noise in the cockpit 16. In another example, the one or more noise cancellation speakers 56 are disposed in the cabin bulkhead 20 and/or the cabin area 18 to cancel and/or attenuate undesirable noise in the cabin area 18. Further and as discussed above, in an exemplary embodiment, the controller(s) 36 is in communication with the array of microphones 22, the array of speakers 26, the array of microphones 28, and the array of speakers 32 for controlling the input and output communication signals.

Figure 4:
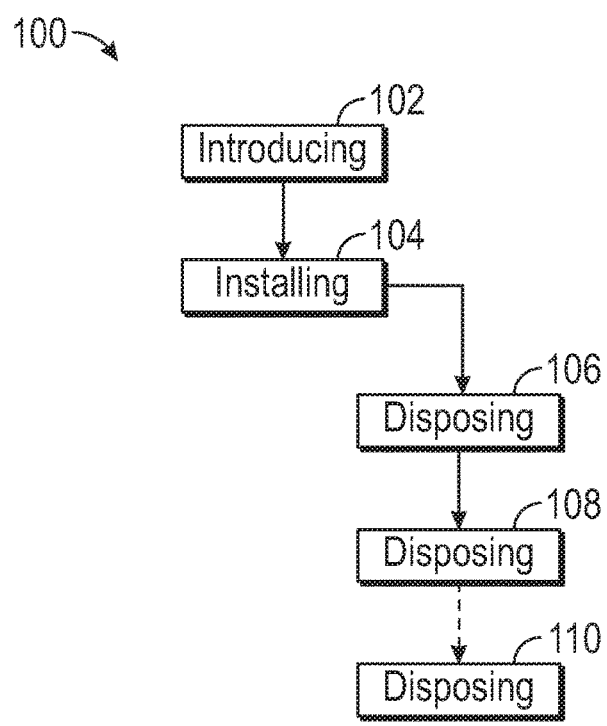
FIG. 4 illustrates a method for making an aircraft in accordance with an exemplary embodiment.

Referring to FIG. 4, the method 100 for making an aircraft in accordance with an exemplary embodiment is provided. The method 100 includes introducing (STEP 102) an arrangement to a fuselage of the aircraft having an interior and including a cockpit and a cabin area that are disposed in the interior separated by a cabin bulkhead.

The arrangement is installed (STEP 104) into the fuselage for at least one of communication and noise attenuation within the aircraft. Installing the arrangement includes disposing (STEP 106) an array of first microphones in the cockpit of the aircraft. The array of microphones is cooperatively configured to be directed towards a first aircraft operator when disposed in a first cockpit seat to receive a first communication input from the first aircraft operator.

In an exemplary embodiment, installing the arrangement further includes disposing (STEP 108) an array of first speakers in the cockpit of the aircraft. The array of first speakers is cooperatively configured to be directed towards the first aircraft operator when disposed in the first cockpit seat to provide a first communication output to the first aircraft operator.

In an exemplary embodiment, installing the arrangement further includes disposing (STEP(s) 110) an array of second microphones and/or an array of second speakers in the cockpit of the aircraft. The array of second microphones is cooperatively configured to be directed towards a second aircraft operator when disposed in a second cockpit seat to receive a second communication input from the second aircraft operator. The array of second speakers is cooperatively configured to be directed towards the second aircraft operator when disposed in the second cockpit seat to provide a second communication output to the second aircraft operator.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An arrangement for at least one of communication and noise attenuation within an aircraft, the arrangement comprising:
    an array of first microphones disposed generally in front of a first cockpit seat and unobstructedly directed towards a first aircraft operator when the first aircraft operator is disposed in the first cockpit seat to cooperatively receive a first communication input from the first aircraft operator;
    an array of first speakers directed towards the first aircraft operator when disposed in the first cockpit seat to cooperatively provide a first communication output to the first aircraft operator;
    an array of second microphones disposed generally in front of a second cockpit seat and unobstructedly directed towards a second aircraft operator when the second aircraft operator is disposed in the second cockpit seat to cooperatively receive a second communication input from the second aircraft operator;
    an array of second speakers directed towards the second aircraft operator when disposed in the second cockpit seat to cooperatively provide a second communication output to the second aircraft operator, wherein the first cockpit seat and the second cockpit seat are adjacent to each other; and
    a controller(s) that is in communication with the array of first microphones, the array of second microphones, the array of first speakers, and the array of second speakers, and wherein the controller(s) is operative to use an algorithm for controlling communication, wherein the controller(s) is configured to provide adaptive control such that the first aircraft operator can independently control the array of first microphones and the array of first speakers, and the second aircraft operator can independently control the array of second microphones and the array of second speakers to create a customized acoustic environment, independently around each of the first and second aircraft operators.

2. The arrangement of claim 1,
    wherein the first communication output corresponds to one of the second communication input and a communication from an air traffic control tower, and the second communication output corresponds to one of the first communication input and the communication from an air traffic control tower, wherein the first communication input is communicated to one of the array of second speakers, the air traffic control tower, and an onboard aircraft speaker system for communication to aircraft passengers, and wherein the second communication input is communicated to one of the array of first speakers, the air traffic control tower, and the onboard aircraft speaker system for communication to the aircraft passengers.

3. The arrangement of claim 2, wherein the array of first microphones is cooperatively configured to receive predominantly the first communication input and not the second communication input while the array of second microphones is cooperatively configured to receive predominantly the second communication input and not the first communication input.

4. The arrangement of claim 2, wherein the array of first speakers is cooperatively configured to provide the first communication output and not the second communication output to the first aircraft operator while the array of second speakers is cooperatively configured to provide the second communication output and not the first communication output to the second aircraft operator.

5. The arrangement of claim 1, further comprising:
    an active noise cancellation device(s) configured for noise attenuation and in communication with the controller(s), wherein the controller(s) is operative to use the algorithm for controlling the noise attenuation.

6. The arrangement of claim 5, further comprising:
    a monitoring device(s) configured for detecting noise in the aircraft and in communication with the controller(s), wherein the controller(s) is operative to use the algorithm to direct the active noise cancellation device(s) to attenuate the noise in response to a signal from the monitoring device(s).

7. The arrangement of claim 2, wherein the first communication output corresponds to the second communication input and the second communication output corresponds to the first communication input.

8. The arrangement of claim 2, wherein the first communication output corresponds to the communication from the air traffic control tower and the second communication output corresponds to the communication from the air traffic control tower.

9. An aircraft comprising:
    a fuselage having an interior and including a cockpit and a cabin area that are disposed in the interior separated by one or more barriers including at least one of a cabin bulkhead or curtain;
    a first cockpit seat disposed in the cockpit and configured for supporting a first aircraft operator; and an arrangement for at least one of communication and noise attenuation for the aircraft, the arrangement comprising:
- an array of first microphones disposed in the cockpit generally in front of the first cockpit seat and unobstructedly directed towards the first cockpit seat to cooperatively receive a first communication input from the first aircraft operator;
- an array of first speakers disposed in the cockpit and directed towards the first cockpit seat to cooperatively provide a first communication output to the first aircraft operator;
- an array of second microphones disposed generally in front of a second cockpit seat and unobstructedly directed towards a second aircraft operator when the second aircraft operator is disposed in the second cockpit seat to cooperatively receive a second communication input from the second aircraft operator;
- an array of second speakers directed towards the second aircraft operator when disposed in the second cockpit seat to cooperatively provide a second communication output to the second aircraft operator, wherein the first cockpit seat and the second cockpit seat are adjacent to each other; and
- a controller(s) that is in communication with the array of first microphones, the array of second microphones, the array of first speakers, and the array of second speakers, and wherein the controller(s) is operative to use an algorithm for controlling communication, wherein the controller(s) is configured to provide adaptive control such that the first aircraft operator can independently control the array of first microphones and the array of first speakers, and the second aircraft operator can independently control the array of second microphones and the array of second speakers to create a customized acoustic environment, independently around each of the first and second aircraft operators.

10. The aircraft of claim 9,
wherein the first communication output corresponds to one of the second communication input and a communication from an air traffic control tower, and the second communication output corresponds to one of the first communication input and the communication from an air traffic control tower, wherein the first communication input is communicated to one of the array of second speakers, the air traffic control tower, and an onboard aircraft speaker system for communication to aircraft passengers, and wherein the second communication input is communicated to one of the array of first speakers, the air traffic control tower, and the onboard aircraft speaker system for communication to the aircraft passengers.

11. The aircraft of claim 10, wherein the array of first microphones is cooperatively configured to receive predominantly the first communication input and not the second communication input while the array of second microphones is cooperatively configured to receive predominantly the second communication input and not the first communication input.

12. The aircraft of claim 10, wherein the array of first speakers is cooperatively configured to provide the first communication output and not the second communication output to the first aircraft operator while the array of second speakers is cooperatively configured to provide the second communication output and not the first communication output to the second aircraft operator, thereby minimizing speaker output to other areas of the cockpit and/or cabin area.

13. The aircraft of claim 10, wherein the arrangement further comprises:
- at least one active noise cancellation device disposed in at least one of the cockpit, the cabin bulkhead, and the cabin area, the at least one active noise cancellation device(s) configured for noise attenuation and is in communication with the controller(s) that is operative to use the algorithm for controlling the noise attenuation.

14. The aircraft of claim 13, wherein the arrangement further comprises:
- a monitoring device(s) disposed in at least one of the cockpit, the cabin bulkhead, and the cabin area, the monitoring device(s), the monitoring device(s) configured for detecting noise in the aircraft and is in communication with the controller(s) that is operative to use the algorithm to direct the active noise cancellation device(s) to attenuate the noise in response to a signal from the monitoring device(s).

15. A method for making an aircraft, the method comprising the steps of:
- introducing an arrangement to a fuselage of the aircraft having an interior and including a cockpit and a cabin area that are disposed in the interior separated by a cabin bulkhead; and
- installing the arrangement into the fuselage for at least one of communication and noise attenuation within the aircraft, wherein installing the arrangement comprises:
  - disposing an array of first microphones in the cockpit of the aircraft generally in front of a first cockpit seat, wherein the array of first microphones is unobstructedly directed towards a first aircraft operator when the first aircraft operator is disposed in the first cockpit seat to cooperatively receive a first communication input from the first aircraft operator;
  - disposing an array of first speakers in the cockpit of the aircraft, wherein the array of first speakers is directed towards the first aircraft operator when disposed in the first cockpit seat to cooperatively provide a first communication output to the first aircraft operator;
  - disposing an array of second microphones in the cockpit of the aircraft generally in front of a second cockpit seat, wherein the array of first microphones is unobstructedly directed towards a second aircraft operator when the second aircraft operator is disposed in the second cockpit seat to cooperatively receive a second communication input from the second aircraft operator; and
  - disposing an array of second speakers in the cockpit of the aircraft, wherein the array of second speakers is directed towards the second aircraft operator when disposed in the second cockpit seat to cooperatively provide a second communication output to the second aircraft operator, wherein the first cockpit seat and the second cockpit seat are adjacent to each other; and
  - arranging a controller(s) in communication with the array of first microphones, the array of second microphones, the array of first speakers, and the array of second speakers, and wherein the controller(s) is operative to use an algorithm for controlling communication, wherein the controller(s) is configured to provide adaptive control such that the first aircraft operator can independently control the array of first microphones and the array of first speakers, and the second aircraft operator can independently control the array of second microphones and the array of second speakers to create a customized acoustic environment, independently around each of the first and second aircraft operators.

16. The method of claim 15, wherein the array of first speakers is cooperatively configured to provide the first communication output and not the second communication output to the first aircraft operator while the array of second speakers is cooperatively configured to provide the second communication output and not the first communication output to the second aircraft operator, thereby minimizing speaker output to other areas of the cockpit and/or cabin area.

17. The method of claim 15, wherein the array of first microphones is cooperatively configured to receive predominantly the first communication input and not the second communication input while the array of second microphones is cooperatively configured to receive predominantly the second communication input and not the first communication input.

* * * * *